No. 865,563. PATENTED SEPT. 10, 1907.
T. J. BROCKWAY.
MIXING APPARATUS.
APPLICATION FILED MAY 22, 1906.
4 SHEETS—SHEET 1.
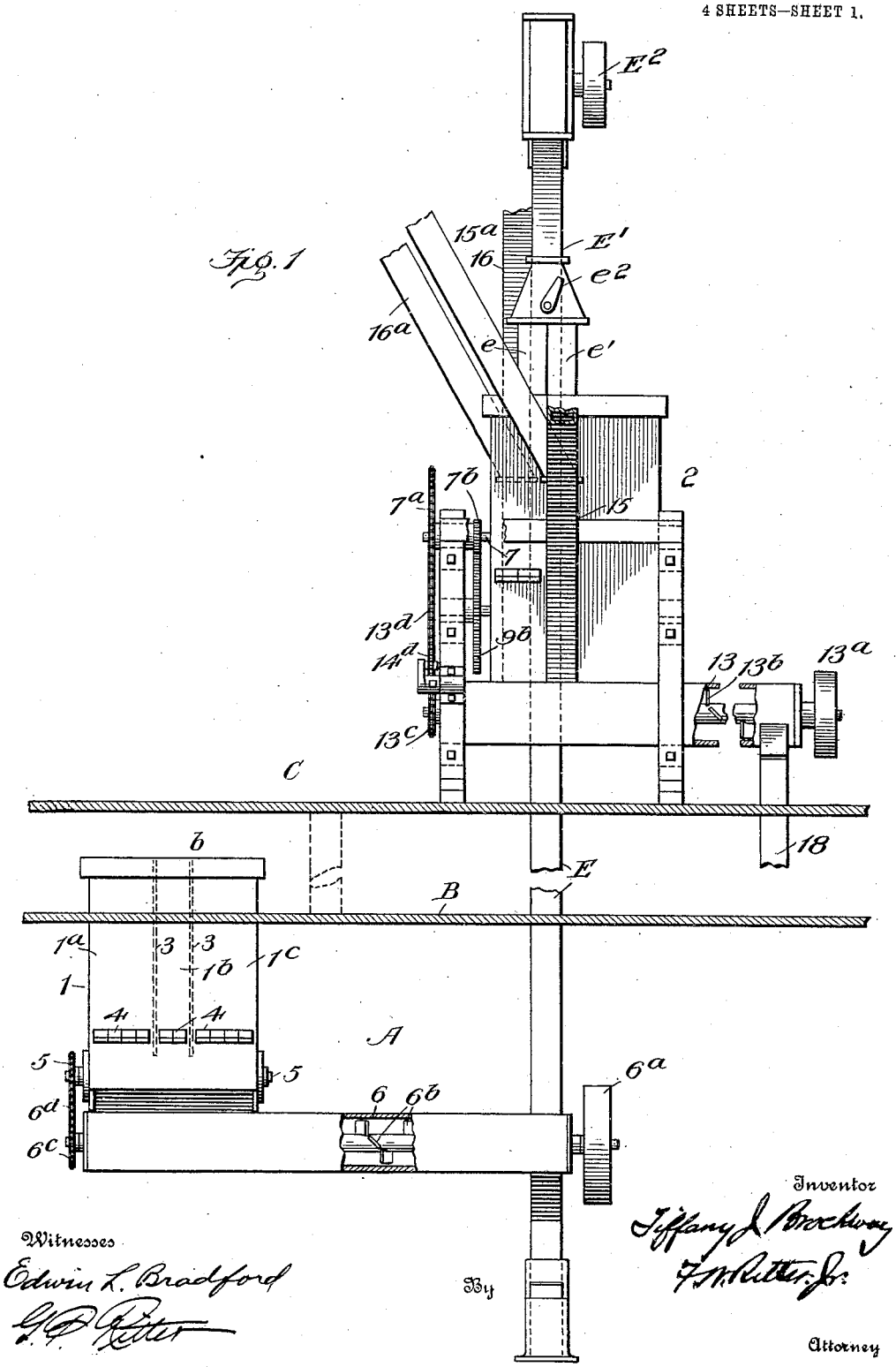

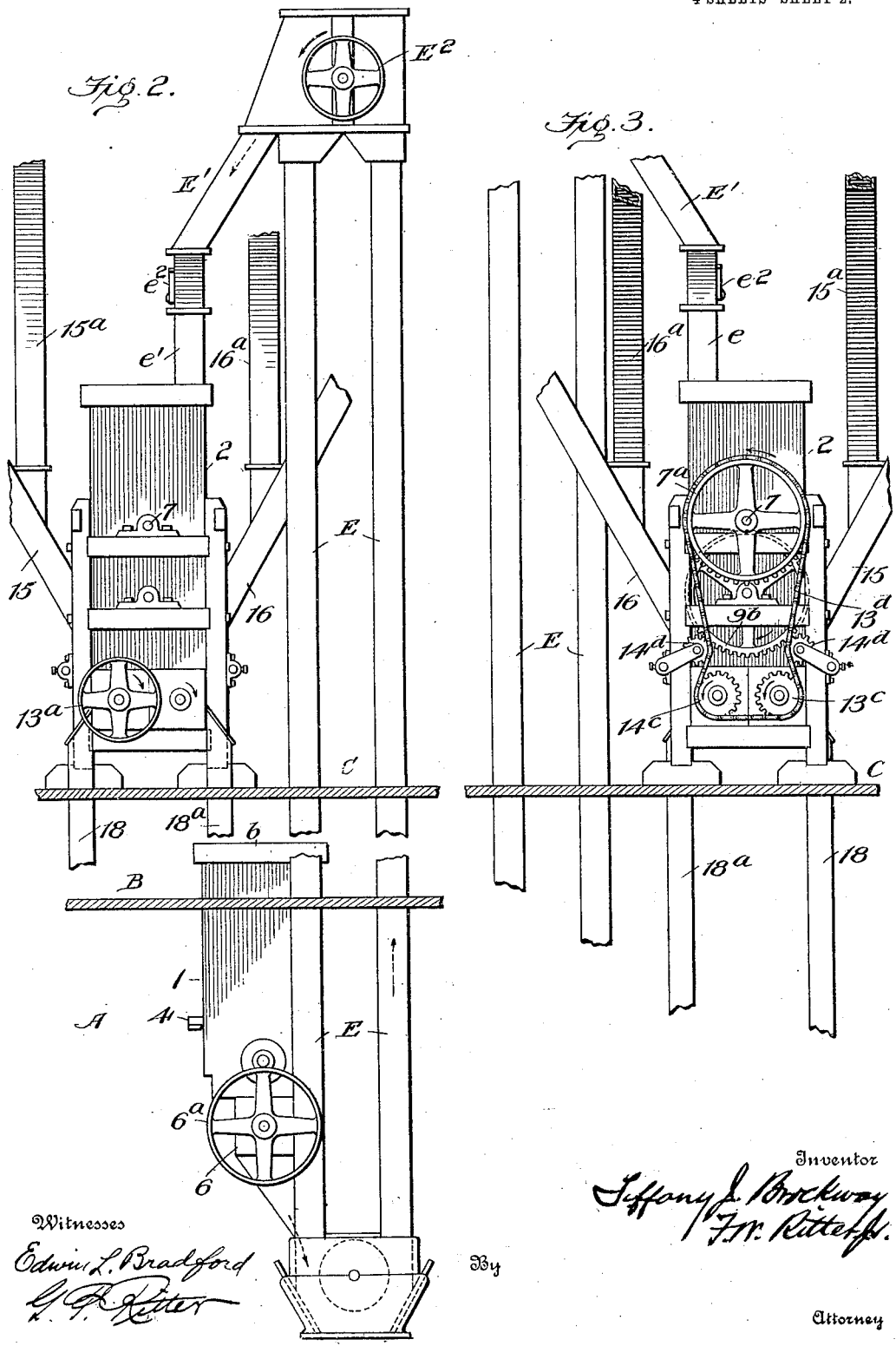

No. 865,563. PATENTED SEPT. 10, 1907.
T. J. BROCKWAY.
MIXING APPARATUS.
APPLICATION FILED MAY 22, 1906.
4 SHEETS—SHEET 3.
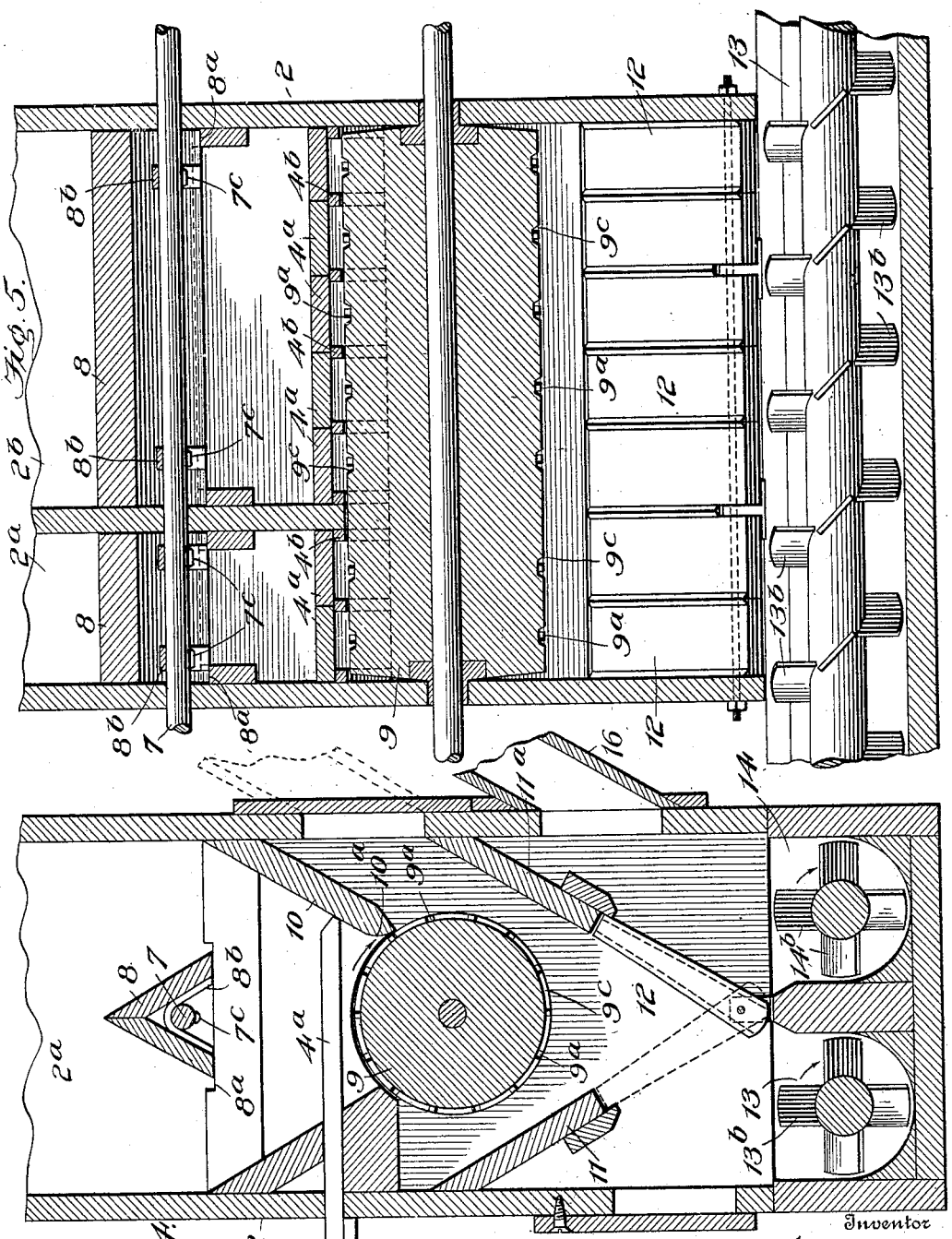

No. 865,563. PATENTED SEPT. 10, 1907.
T. J. BROCKWAY.
MIXING APPARATUS.
APPLICATION FILED MAY 22, 1906.
4 SHEETS—SHEET 4.
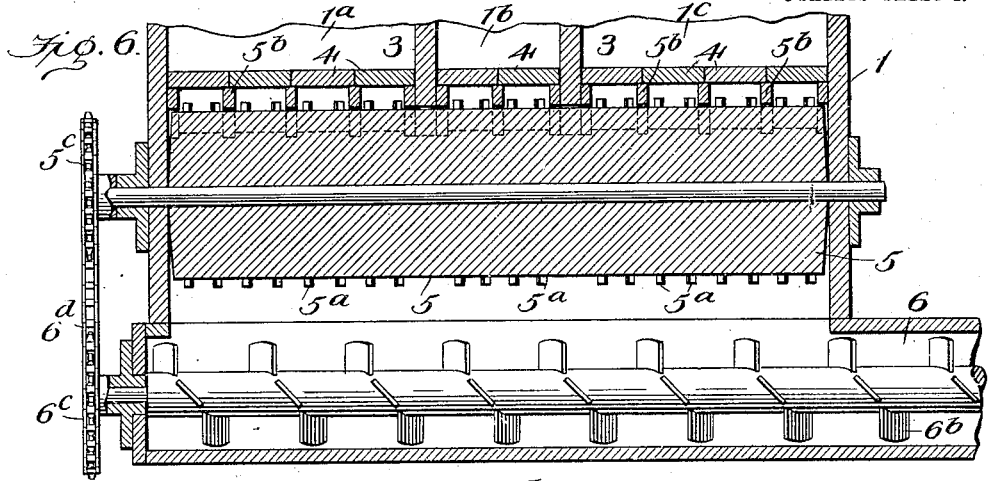
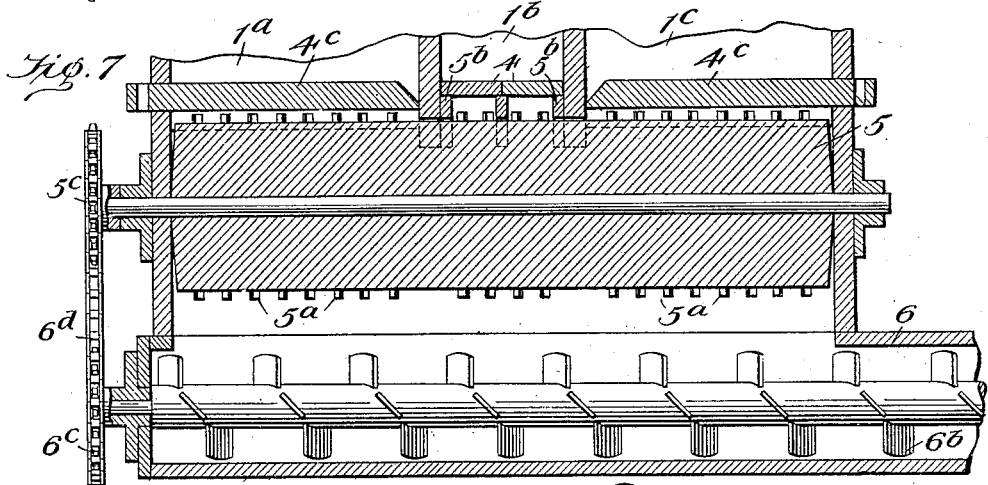
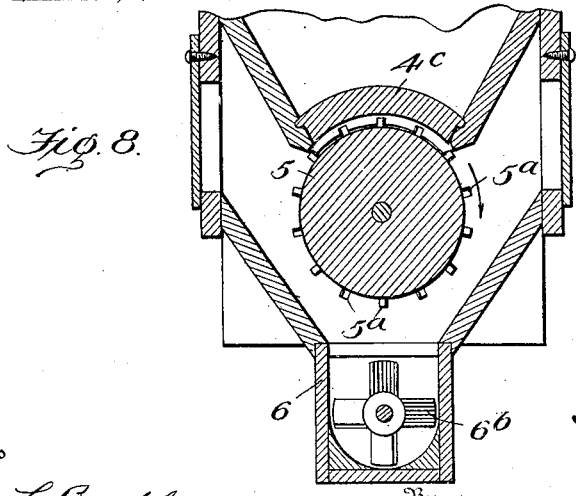

UNITED STATES PATENT OFFICE.

TIFFANY J. BROCKWAY, OF ALINE, OKLAHOMA TERRITORY.

MIXING APPARATUS.

No. 865,863.  Specification of Letters Patent.  Patented Sept. 10, 1907.

Application filed May 22, 1906. Serial No. 318,178.

*To all whom it may concern:*

Be it known that I, TIFFANY J. BROCKWAY, a citizen of the United States, residing at Aline, in the county of Woods and Territory of Oklahoma, have invented certain new and useful Improvements in Mixing Apparatus; and I do hereby declare the following to be a full, clear, and exact description of the invention, such as will enable others skilled in the art to which it appertains to make and use the same.

My invention relates to the construction of that class of devices adapted for combining salines, tonics, vegetable appetizers, &c., and mill-products and by-products, for the production of stock feed of the class commonly termed balanced-rations.

To this end, my invention, generally stated, embraces the combination and relative arrangement of a plurality of feeders and mixers, interposed conveyers, and spouting, whereby the tonics and appetizers are first proportioned with relation to each other and intermingled, and the mixture thus formed is subsequently proportioned and intermingled with mill products and by-products.

A second feature of my invention embraces the combination, in the feeders and mixers, of a plurality of hoppers, with a feed-roll, a mixer and conveyer, and a plurality of slides interposed between the hoppers and the feed-roll or rolls, whereby the relative proportions of the constituents of the mixture are controlled.

A third feature of my invention embraces the combination in a feeder and mixer, of a plurality of hoppers, a plurality of mixers and conveyers, a plurality of slides, a feed roll, and a plurality of valves or gates interposed between the feed roll and the mixers and conveyers, whereby different grades of balanced rations may be produced.

There are other, minor, features of invention relating to the construction of the feed rolls of the feeders, the relative arrangement of the primary and secondary feeders and mixers, and similar details of construction, all as will hereinafter more fully appear.

In the drawings accompanying this specification and illustrating the preferred application of the invention, Figure 1 is a side elevation of a mixing plant embodying my invention, parts broken away. Fig. 2 is an end elevation of the same. Fig. 3 is an end elevation of the secondary feeder and mixer and the spouting leading thereto, showing the driving gear of the feed-roll. Fig. 4 is a transverse vertical section of the secondary feeder and mixer. Fig. 5 is a longitudinal vertical section of the secondary feeder and mixer. Fig. 6 is a longitudinal vertical section of the primary feeder and mixer. Fig. 7 is a longitudinal vertical section of a modification of the primary feeder and mixer. Fig. 8 is a transverse vertical section of the primary feeder and mixer.

Like symbols refer to like parts wherever they occur.

I will now proceed to describe my invention more fully so that others skilled in the art may apply it, either as illustrated or in such modification thereof as circumstances may require.

In the arrangement of the plant chosen for purposes of illustration, the primary feeder and mixer 1 is located in the basement A, the hoppers thereof preferably extending up into a suitable feed chamber $b$ on the first floor B of the structure, while the secondary feeder and mixer 2, or final mixing device, is located on the second floor C, though any other relative location of the mixing devices 1 and 2 which the requirements demand may be adopted.

The first, or primary, feeder and mixer, is provided with a plurality of hoppers $1^a$, $1^b$, $1^c$ of any desired or required number, said hoppers being separated by suitable partitions 3, 3, and closed below by a plurality of laterally arranged slides 4, 4, which extend through the sides of the hoppers at the bottom thereof so that any one or more of said slides may be partially or wholly withdrawn to control the volume of material delivered from each of said hoppers.

Immediately below the hoppers $1^a$, $1^b$, $1^c$ is a feed roll 5 provided on its periphery with a series of small flights $5^a$ which are preferably not more than one quarter of an inch in height, inserted in the roll after the manner of inserting dowel-pins, and either regularly or irregularly disposed thereon as may be preferred, the flights being by choice arranged spirally and at varying angles, as thus best serving to insure against clogging. Those flights which are located below the hopper $1^b$, or that hopper intended for saline tonics, should preferably be of some composition or metal which will withstand grinding wear.

Below the hoppers $1^a$, $1^b$, $1^c$ on the line of junction of slides 4 and extending down to the feed roll 5, are a series of short vertical partitions $5^b$, the lower edges of which are cut on the arc of a circle corresponding to the feed roll, the flights $5^a$ being omitted at such points. These partitions are secured in place by screws countersunk in the partitions $5^b$ and extending therethrough into the feed boards or adjacent parts, in the well known manner of "toe-nailing", and, in conjunction with the slides, serve to limit the volume of the material and direct it in its passage to the feed roll.

Beneath and in line with the feed roll 5 is a conveyer and mixer 6 which receives the materials from the feed roll 5 and thoroughly mixes them during their passage to the elevator. This conveyer and mixer may be of any approved form, though preferably, as shown in the drawings, it is a shaft provided with a pulley $6^a$ driven from the power shaft of the mill, or any suitable power shaft, and having the usual spirally arranged wooden flights $6^b$. The conveyer shaft is, or may be, provided with a sprocket wheel 6ᶜ from which through a chain belt 6ᵈ passing to a sprocket wheel 5ᶜ on the shaft of feed roll 5, the latter is driven. This primary feeder and mixer, which is intended to proportion and thoroughly mix the saline tonics and vegetable appetizers or aromatics, delivers into an elevator E, preferably of the chain and bucket type, which conveys the tonic and appetizer mixture to the upper or secondary feeder and mixer 2, which latter may be, and preferably is, located upon the upper floor C of the mill. This secondary feeder and mixer 2 is of the same general construction and character as the primary feeder and mixer 1, except for certain added features which control the speed of the feed roll, the character of the feed, and provide for varying the grade of the ration. In said secondary feeder and mixer, 2ᵃ, 2ᵇ indicate hoppers into which the elevator E delivers through the conduits e, e′, the direction of the material into one or the other of said conduits, as desired, being controlled by a valve or gate e², located in the discharge spout E′ of elevator E. The elevator E may be driven through pulley E² from any suitable power shaft.

Passing through the hoppers 2ᵃ, 2ᵇ of the secondary feeder and mixer 2 is a shaft 7, having on its outer end a sprocket wheel 7ᵃ by which it is driven and having also a small pinion 7ᵇ which meshes with a larger pinion 9ᵇ on the shaft of the feed roll 9.

Within the hoppers 2ᵃ, 2ᵇ and straddling the shaft 7 is an agitator-bar or break-beam 8 having two converging sides meeting at the top to form a shed for the shaft as well as to break the downward flow of the material in the hopper. Said break-beam rests upon shoulders or seats 8ᵃ on the ends of the hoppers when the machine is not in operation, but is vibrated by projections 7ᶜ on the shaft 7 when said shaft rotates, thus agitating and loosening the material in the hoppers when the mixing devices are in operation. In order to strengthen the break-beam 8, which is preferably of wood, a V-shaped metal brace bar 8ᵇ may be provided on its interior.

The bottoms of the hoppers 2ᵃ, 2ᵇ are closed by a plurality of slides 4ᵃ, 4ᵃ similar in construction, location, and operation to the slides 4 of the primary feeder and mixer 1, and below the slides and between the same and the feed roll 9 are a series of short partitions 4ᵇ also similar in form and function to the partitions 5ᵇ of the primary feeder and mixer 1. At this point in the plant, where the saline tonics and appetizers are to be accurately proportioned to the mill products and the percentage of the tonics and appetizers is very small, a careful and special construction of the feed rolls for small mills is desirable, and to this end the feed roll 9, in addition to having the flights 9ᵃ (corresponding to the flights 5ᵃ of roll 5), is provided with annular grooves 9ᶜ in which said flights 9ᵃ are located. In some cases the shallow annular grooves 9 may be used without the flights 9ᵃ when the character of the mixture insures an even and uniform feed. These grooves 9 may also be made narrower or broader to suit desired capacity of infeed for any mill.

The annular grooves 9ᶜ, which encircle the roll 9 and preferably correspond in number to the number of slides 4ᵃ in the hoppers 2ᵃ, 2ᵇ, are located below said slides and between the short partitions 4ᵇ and, while comparatively narrow and shallow, their cross sectional area will depend measurably on the character of the mixture and the feed capacity required, but care should be taken that the size of the grooves 9ᶜ is not so restricted as to prevent an even and unobstructed flow of any of the several tonics or appetizers which may be required to be fed thereby.

In order to obtain an even and constant flow of the mixture it is desirable that the feed board 10 on the feed side of the feed roll 9 be rounded off as shown at 10ᵃ, and, as a matter of preference, all feed boards are inclined at about an angle of 60 degrees to the horizontal. The chamber containing the feed roll 9 is formed as a hopper with downwardly converging sides 11, 11ᵃ, at the intersection of which is located a shaft carrying a series of valves or gates 12 adapted to be turned either to the right or left accordingly as the feed from the roll 9 is to be directed into one or the other of two mixers and conveyers 13, 14. The conveyers 13 and 14 are alike, and similar to the conveyer 6 of the primary feeder and mixer 1, that is to say, each is provided with flights 13ᵇ (14ᵇ) and a sprocket wheel 13ᵃ (14ᶜ). The shaft of one of said conveyers, as 13, is provided with a pulley 13ᵃ through which it is driven by belting from a suitable power shaft. From the conveyers 13, 14 suitable spouts or conduits 18, 18ᵃ lead to the packers.

Break-beam shaft 7, and feed roll 9 are driven from the shaft of conveyer 13 through sprocket wheels 13ᶜ and 14ᶜ, sprocket chain 13ᵈ, sprocket wheel 7ᵃ and pinions 7ᵇ and 9ᵇ, and it will be noted that the arrangement is a form of low gearing, as it is desirable that the conveyers 13 and 14 have a comparatively rapid rotation while the feed roll rotates slowly, say approximately at the rate of two or three revolutions per minute. 14ᵈ indicates idler sprockets journaled on pivoted brackets and intended to take up the slack of the sprocket chain 13ᵈ and to increase its driving engagement with the sprocket wheels 13ᶜ, 14ᶜ and 7ᵃ.

15, 15ᵃ, 16, and 16ᵃ indicate the spouting for the ground grain and mill by-products, such as mill run of corn, oats, shorts, middlings, bran, tailings, &c., which are mixed in varying proportions according to the grade of the ration desired. Each of these conduits or spouts is provided with a suitable valve or cut-off. Of these conduits or spouts, those indicated as 15 and 16 are connected with the conveyer chambers (or if preferred with the feed roll chamber as indicated in dotted lines Fig. 4) on opposite sides thereof and deliver therethrough directly into one or the other of the mixers and conveyers 13, 14, according to the position of the gates or valves 12, while the spouts indicated by 15ᵃ and 16ᵃ, deliver into the spouts 15 and 16, respectively.

In the modification of the primary feeder and mixer 1, shown in Figs. 7 and 8 of the drawing, the only change in the construction from that heretofore described relates to the employment of single end slides 4ᶜ for the outer hoppers 1ᵃ and 1ᶜ in lieu of a plurality of side slides 4 or 4ᵃ as shown in Figs. 5 and 6 of the drawings, with the vertical partitions 5ᵇ omitted, and this latter construction is sometimes desirable as the percentages of the ingredients contained in the mixture can be more widely varied by the use of such end slides than can be readily done with side slides in the outer hoppers.

In the operation of the devices herein described, one feeder and mixer supplements the other, that is to say, the character of the ration and the percentage of contained saline tonics, appetizers, &c., therein will be controlled by the relative arrangement of the slides and the character of the feed rolls in both feeders and mixers, the character of the feed roll of the secondary feeder and mixer being to some extent controlled by the capacity of the mill.

In Figs. 1 to 6 of the drawings the elemental construction of the primary feeder and mixer 1 and that of secondary feeder and mixer 2 are such as adapt the plant to mills of small or medium capacity, but in case of mills of large capacity the feed roll 5 of feeder and mixer 1, is preferably substituted for feed roll 9 with annular grooves 9ᵉ, and in some instances it is desirable that the end slides 4ᵉ be substituted for the side slides in hoppers 1ᵃ, 1ᶜ.

The construction and arrangement of the plant being substantially of the character hereinbefore set forth the operation thereof will be as follows. The saline tonics, appetizers, &c., which are usually received in bulk, as for instance in car-load lots, will, for convenience in handling, be delivered in the feed room b on the first floor, where they will be sorted and shifted, if necessary, and introduced into the respective hoppers 1ᵃ, 1ᵇ, &c. of the primary feeder and mixer 1.

Ordinarily the hopper 1ᵇ will be used for the saline tonics, and one or more of the other hoppers for aromatics, appetizers, &c., the number of the hoppers being increased in the construction of the feeder and mixer according to the demands of the number of ingredients of the primary mixture. The slides 4 of the hopper 1ᵇ will then be drawn out the required distance to allow the desired volume of the saline tonics to pass therefrom to the feed-roll 5, and the slides 4 of the remaining hopper or hoppers will be also adjusted to permit the passage of the proportionate amounts of the other ingredients of the mixture.

In some instances where the feeding capacity of the feed roll 9 of the secondary feeder and mixer 2 is greater than the required percentage of saline tonics, appetizers, &c. required in the ration, one of the hoppers 1ᵃ or 1ᶜ of the primary feeder and mixer 1 will be charged with a diluent or reducer such as bran, chopped corn, ground cotton-seed, or the like, and the percentage of tonics and appetizers of the primary mixture thus reduced in the primary feeder and mixer to meet required feed in the secondary feeder.

The slides of the several hoppers 1ᵃ, 1ᵇ, &c. having been properly adjusted relatively and the several hoppers charged with the required ingredients, when the plant is set in operation the ingredients received in the mixer and conveyer 6, will be thoroughly intermingled therein and passed continuously therefrom to the elevator E by which the mixture will be lifted and deposited in the secondary feeder and mixer 2, the position of the gate or valve e² thereof determining into which of the hoppers 2ᵃ or 2ᵇ the mixture shall pass. As a matter of preference, the hopper 2ᵃ of the secondary feeder and mixer 2 is reserved for aromatic mixtures, while the hopper 2ᵇ is used for the combined tonics. The slides 4ᵃ of the hopper or hoppers of feeder and mixer 2 will be adjusted to allow the required volume of the ingredients to pass to the feed roll 9, and the vibration of the break-beam 8 or agitator caused by the rotation of shaft 7 will relieve the feed roll of variable pressure and insure an even and uniform feed from the roll into the roll chamber. In the meantime the gates or valves of the spouting 15, 15ᵃ, 16 and 16ᵃ having been manipulated to permit the passage of the desired mill product, or by-product required for the particular ration, as for instance mill-run of corn or oats, mill-run of middlings, shorts, tailings, or bran, one or more, as the case may be, the stock from the said spouting will be delivered into the secondary feeder and mixer 2 below the feed roll 9 (or within the conveyer chambers on each side direct) where it will unite and mix with the predetermined percentage of saline tonics, appetizers, &c. and will pass directly to one or other of the mixers and conveyers 13, 14, according to the position of the spouting and the gates or valves 12, and from the conveyer by conduits 18, 18ᵃ to the packers.

Having thus described my invention, what I claim and desire to secure by Letters Patent is:

1. In apparatus for mixing balanced rations, the combination of a primary feeder and mixer having a plurality of hoppers, slides or gates therefor, and a feed roll, a secondary feeder and mixer having a plurality of hoppers, slides or gates therefor, and a feed roll, and an interposed conveyer which connects the primary and secondary feeders and mixers.

2. In apparatus for mixing balanced rations, the combination of a primary feeder and mixer having a plurality of hoppers, slides or gates therefor, and a feed roll, a secondary feeder and mixer having a plurality of hoppers, slides or gates therefor, and a feed roll, a conveyer which connects the primary feeder and mixer with the secondary feeder and mixer, and spouting which delivers into the secondary feeder and mixer.

3. In apparatus for mixing balanced rations, the combination of a primary feeder and mixer having a plurality of hoppers, slides or gates for the hoppers, and a feed roll provided with flights, a secondary feeder and mixer having a plurality of hoppers, slides or gates therefor, and a feed roll, and means for conveying the material from the primary feeder and mixer to the secondary feeder and mixer.

4. In apparatus for mixing balanced rations, the combination of a primary feeder and mixer having a plurality of hoppers, slides or gates therefor and a feed roll, a secondary feeder and mixer having a plurality of hoppers, slides or gates therefor, and a feed roll provided with annular grooves, and a conveyer which connects the primary feeder and mixer with the secondary feeder and mixer.

5. In apparatus for mixing balanced rations, the combination of a primary feeder and mixer having a plurality of hoppers, slides or gates therefor and a feed roll, of a secondary feeder and mixer having a plurality of hoppers, slides or gates therefor and a feed roll provided with annular grooves and flights, and means for conveying the material from the primary feeder and mixer to the secondary feeder and mixer.

6. In apparatus for mixing balanced rations, the combination of a primary feeder and mixer having a plurality of hoppers, slides or gates therefor, a feed roll and a mixer and conveyer, a secondary feeder and mixer having a plurality of hoppers, slides or gates therefor, a feed roll, and a mixer and conveyer, gates or valves below the feed roll of the secondary feeder and mixer, and means for conveying the material from the primary feeder and mixer to the secondary feeder and mixer.

7. In apparatus for mixing balanced rations, the combination of a primary feeder and mixer, a secondary feeder and mixer having a plurality of hoppers, a feed roll and a plurality of mixers and conveyers, and means for conveying the material from the primary feeder and mixer to the secondary feeder and mixer, said means being provided with a valve or gate for directing the material into either of the hoppers of the secondary feeder and mixer.

8. In apparatus for mixing balanced rations, the combination of a primary feeder and mixer, having a plurality of hoppers, slides or gates therefor, a feed roll and a mixer and conveyer, a secondary feeder and mixer having a plurality of hoppers, slides or gates therefor, and a feed roll, a vibratory break-beam arranged in the hoppers of the secondary feeder and mixer, and means for conveying the material from the primary feeder and mixer to the secondary feeder and mixer.

9. In apparatus for mixing balanced rations, the combination of a primary feeder and mixer having a plurality of hoppers, slides or gates therefor, a feed roll and a mixer and conveyer, a secondary feeder and mixer having a plurality of hoppers, slides or gates therefor, a feed roll and a plurality of mixers and conveyers, means for conveying the material from the primary feeder and mixer to the secondary feeder and mixer said means being provided with a gate or valve for directing the material into either hopper of the secondary feeder and mixer, and valves or gates in the secondary feeder and mixer for directing the material into either of the mixers and conveyers thereof.

10. In apparatus for mixing balanced rations, the combination of a primary feeder and mixer having a plurality of hoppers, slides or gates therefor, a feed roll and a mixer and conveyer, a secondary feeder and mixer having a plurality of hoppers, slides or gates therefor, a feed roll and a plurality of mixers and conveyers, means for conveying the material from the primary feeder and mixer to the secondary feeder and mixer, a break-beam arranged in the hoppers of the secondary feeder and mixer, and valves or gates interposed between the feed roll and the mixers and conveyers of said secondary feeder and mixer.

11. In apparatus for mixing balanced rations, a feeder having in combination, a plurality of hoppers, a plurality of slides therefor, and a feed roll having a series of annular grooves.

12. In apparatus for mixing balanced rations, a feeder having in combination a plurality of hoppers, a plurality of slides therefor, and a feed roll having a series of grooves provided with flights.

13. In apparatus for mixing balanced rations, a feeder having in combination a plurality of hoppers, a plurality of slides therefor, a feed roll having annular grooves corresponding in number with the slides of the hoppers, and partitions arranged beneath the slides and separating the grooves of the feed roll.

14. In apparatus for mixing balanced rations, a feeder having in combination, a plurality of hoppers, a plurality of slides therefor, a feed roll, and a vibratory break-beam arranged in the hoppers over the slides and feed roll.

15. In apparatus for mixing balanced rations, the combination of a primary feeder and mixer having a plurality of hoppers, slides or gates therefor, and a feed roll, of a secondary feeder and mixer having a plurality of hoppers, slides or gates therefor, and a feed roll, and means for conducting the mixed material from the primary to the secondary feeder and mixer.

In testimony whereof I affix my signature, in presence of two subscribing witnesses.

TIFFANY J. BROCKWAY.

Witnesses:
T. B. TOWNSEND,
WM. SMITH.